Dec. 17, 1935.                W. KRAMER                2,024,825
WHITTLING KNIFE
Filed July 3, 1935
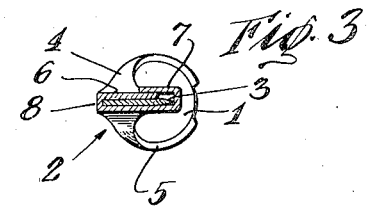
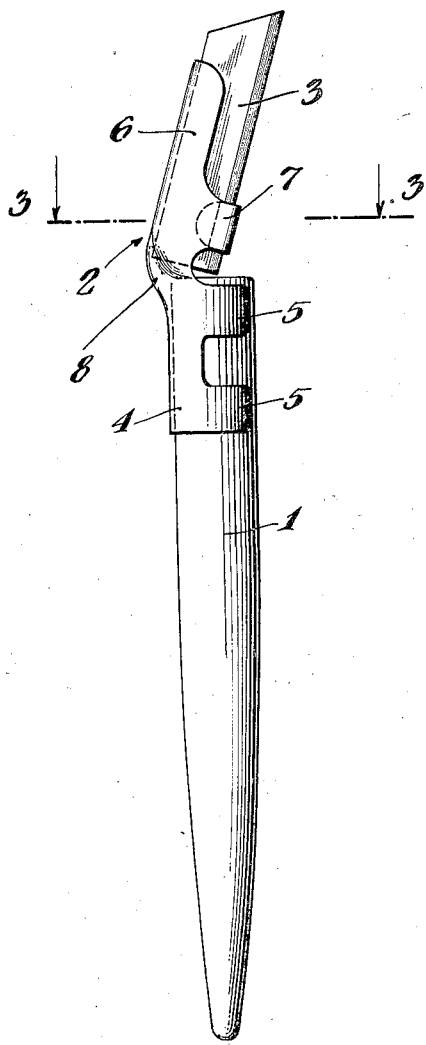
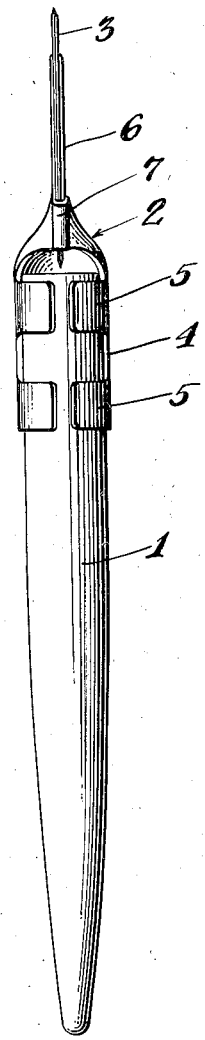
INVENTOR
William Kramer
BY
Frederick W. Barker
ATTORNEY Patented Dec. 17, 1935

2,024,825

UNITED STATES PATENT OFFICE 2,024,825

WHITTLING KNIFE

William Kramer, Richmond Hill, N. Y., assignor to Ideal Aeroplane & Supply Co., Inc., New York, N. Y., a corporation of New York Application July 3, 1935, Serial No. 29,594

1 Claim. (Cl. 30—9)

This invention relates to blade holders and my improvement is directed to simple and economical means for fixedly connecting a whittling or skiving blade to a handle, such means comprising a piece of flat metallic material, stamped out to include a portion which is adapted to be clamped about the handle end, and another portion which is adapted to be clamped about the blade, to thus unite the blade and handle.

Other features and advantages of my invention will hereinafter appear.

In the drawing:

Figure 1 is a side view of my improved whittling knife.

Fig. 2 is a front view thereof, and

Fig. 3 is a section on the line 3—3 of Fig. 1.

In said views let 1 indicate a handle, 2 a blade holder that is clamped to said handle, and 3 a blade that is held in clamped relation by said holder, thus rigidly connecting the blade and handle.

The holder 2 is composed of the handle gripping portion 4 which is shown as having the spaced fingers 5 that are capable of being more easily bent around the handle than would be the case in seeking to similarly bend the undivided sheet material.

The material of the holder 2, beyond the handle is folded into parallel plies 6 which are adapted to receive, between them, the blade 3, said plies 6 being clamped firmly against the sides of said blade at the rear portion thereof, to hold the blade rigidly in position.

A tongue or strap 7 that is extended from one of the plies 6, is wrapped around the blade edge, near the heel of said blade, and, lying upon the other of said plies 6, thereby serves to lock the blade in its engaged position.

The holder 2, near the junction of its handle, and blade clamping portion, is provided with a formed, rearward jog 8 which has the effect of canting the blade holding portion at a forward inclination, whereby, in the use of the knife, as in whittling wood, the blade edge functions more efficiently by reason of the blade edge, which is similarly inclined, having a greater tendency to cling to the material being cut.

Variations within the spirit and scope of my invention are equally comprehended by the foregoing disclosure.

I claim:—

A knife comprising a handle, a holder and a blade, said holder consisting of a piece of metallic sheet material having a portion that is bent around the handle end portion and clamped thereon, also a continuing portion that is folded into parallel plies and clamped upon the rear portion of the blade, one of its plies having a tongue portion that is folded over the heel portion of the blade and clamped upon the other ply.

WILLIAM KRAMER.